United States Patent
Johnson et al.

(10) Patent No.: US 9,699,970 B2
(45) Date of Patent: Jul. 11, 2017

(54) COMBINE SIDE-SHAKE CLEANING CONTROL SYSTEM

(71) Applicant: CNH America LLC, New Holland, PA (US)

(72) Inventors: Orlin W. Johnson, Geneseo, IL (US); Dale William Panoushek, Orion, IL (US); Craig E. Murray, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 101 days.

(21) Appl. No.: 14/031,915

(22) Filed: Sep. 19, 2013

(65) Prior Publication Data
US 2015/0080070 A1    Mar. 19, 2015

(51) Int. Cl.
| | | |
|---|---|---|
| *A01D 75/18* | (2006.01) |
| *A01F 12/16* | (2006.01) |
| *A01F 21/00* | (2006.01) |
| *A01F 12/44* | (2006.01) |
| *A01D 41/127* | (2006.01) |
| *A01D 75/28* | (2006.01) |

(52) U.S. Cl.
CPC ........ *A01F 12/448* (2013.01); *A01D 41/1273* (2013.01); *A01D 75/282* (2013.01)

(58) Field of Classification Search
CPC .............. A01D 41/1273; A01D 41/127; A01D 75/282; A01F 12/448; B07B 1/42; B07B 1/46; G05B 2219/2214; G05B 2219/25032

USPC ................ 460/5, 101, 9, 91; 701/50, 36, 48; 209/233; 700/31
See application file for complete search history.

(56) References Cited

U.S. PATENT DOCUMENTS

| | | | | |
|---|---|---|---|---|
| 3,935,866 | A | * | 2/1976 | Northup et al. ................... 460/4 |
| 4,344,443 | A | * | 8/1982 | De Busscher ....... A01D 75/282 460/150 |
| 4,355,647 | A | * | 10/1982 | Heidjann et al. ............... 460/91 |
| 4,360,998 | A |   | 11/1982 | Somes |
| 4,490,964 | A | * | 1/1985 | Eldredge .......................... 460/5 |
| 4,535,788 | A | * | 8/1985 | Rowland-Hill ...... A01D 75/282 209/416 |
| 4,736,753 | A | * | 4/1988 | Glaubitz et al. .................. 460/9 |
| 4,765,190 | A | * | 8/1988 | Strubbe ............. A01D 41/1271 222/71 |
| 4,897,071 | A |   | 1/1990 | Desnijder et al. |
| 4,897,072 | A | * | 1/1990 | Bestland ............... A01F 12/448 209/394 |

(Continued)

*Primary Examiner* — Árpád Fábián-Kovács
(74) *Attorney, Agent, or Firm* — Patrick M. Sheldrake

(57) ABSTRACT

A combine side-shaking control system includes a sieve for separating crop material from other materials and a movable side-shaking mechanism coupled to the sieve and configured to move the sieve in a side-to-side motion. The control system also includes also includes first and second grain loss sensors configured to sense amounts of grain loss from separate portions of the sieve. The control system further includes a controller configured to: (i) receive a first grain loss value corresponding to the sensed first amount of grain loss and a second grain loss value corresponding to the sensed second amount of grain loss; and (ii) cause the side-shaking mechanism to control movement of the sieve in the side-to-side motion based on at least one of the received first grain loss value and the received second grain loss value.

14 Claims, 9 Drawing Sheets

(56) References Cited

U.S. PATENT DOCUMENTS

| | | | |
|---|---|---|---|
| 5,488,817 A * | 2/1996 | Paquet et al. | 56/10.2 R |
| 6,119,442 A * | 9/2000 | Hale | 56/10.2 H |
| 6,205,384 B1 | 3/2001 | Dickhans | |
| 6,579,172 B2 * | 6/2003 | Lauer | 460/101 |
| 6,592,453 B2 | 7/2003 | Coers et al. | |
| 6,726,559 B2 | 4/2004 | Bischoff | |
| 6,863,604 B2 * | 3/2005 | Behnke | 460/6 |
| 6,899,616 B1 * | 5/2005 | Murray | A01D 41/1271 460/6 |
| 7,001,267 B2 * | 2/2006 | Behnke et al. | 460/6 |
| 7,306,513 B2 | 12/2007 | Mackin et al. | |
| 7,322,882 B2 | 1/2008 | Duquesne et al. | |
| 7,572,180 B2 | 8/2009 | Ricketts | |
| 7,630,809 B2 | 12/2009 | Behnke et al. | |
| 7,927,199 B2 * | 4/2011 | Adamson et al. | 460/101 |
| 8,118,649 B1 * | 2/2012 | Murray | A01D 75/282 460/4 |
| 8,282,453 B1 | 10/2012 | Hillen et al. | |
| 8,880,299 B2 | 11/2014 | Murray et al. | |
| 8,968,064 B2 * | 3/2015 | Kile | A01F 12/58 460/4 |
| 2004/0186597 A1 * | 9/2004 | Wippersteg et al. | 700/31 |
| 2005/0137003 A1 | 6/2005 | Behnke et al. | |
| 2005/0143153 A1 * | 6/2005 | Behnke et al. | 460/4 |
| 2005/0282601 A1 * | 12/2005 | Duquesne et al. | 460/101 |
| 2006/0229119 A1 * | 10/2006 | Wamhof et al. | 460/101 |
| 2008/0318648 A1 * | 12/2008 | Baumgarten et al. | 460/5 |
| 2009/0036184 A1 * | 2/2009 | Craessaerts | A01F 12/448 460/1 |
| 2009/0048744 A1 * | 2/2009 | Ricketts | A01D 75/282 701/50 |
| 2009/0313962 A1 | 12/2009 | Talbi | |
| 2010/0016044 A1 | 1/2010 | Adamson et al. | |
| 2012/0184339 A1 * | 7/2012 | Schulz | A01F 12/444 460/78 |
| 2012/0322521 A1 * | 12/2012 | Baumgarten | A01D 75/282 460/69 |
| 2013/0158816 A1 * | 6/2013 | Murray et al. | 701/50 |
| 2014/0206421 A1 * | 7/2014 | Kile | A01F 12/58 460/4 |
| 2014/0335923 A1 * | 11/2014 | Biggerstaff | A01D 41/127 460/75 |

* cited by examiner

COMBINE SIDE-SHAKE CLEANING CONTROL SYSTEM

TECHNOLOGY FIELD

The present invention relates generally to a control system for a side-shake cleaning mechanism for use with a harvester, such as a combine harvester, and more particularly to methods and systems to control a side-shake cleaning mechanism in a combine harvester.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, flax or linseed, and others. The waste (e.g. straw) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the chaff and straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. At the same time that MOG is being expelled from the combine, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a combination of oscillating screens (sieves), a fan which blows air through/above/beneath the sieves, and some mechanism which transports the crop material to be cleaned from beneath the threshing system to the sieves. Clean grain that is separated from the residue via the sieves is typically transported to a grain tank in the combine for temporary storage. The grain tank is typically located atop the combine and loaded via a conveyer that carries clean grain collected in the cleaning system to the grain tank. The grain may then be unloaded through a conveying system to a support trailer or vehicle, allowing large quantities of grain to be unloaded in the field without needing to stop harvesting when the grain tank fills. During operation, the crop material may be unevenly distributed in the cleaning system (e.g., on one or more sieves) caused by a change in inclination (e.g., harvesting on uneven terrain). Conventional combines may be equipped with uneven distribution compensation mechanisms. During flat ground operation, the cleaning system of a combine moves in 2-dimensional motion, shaking fore/aft with some vertical component. U.S. Pat. No. 7,322,882, which is incorporated herein for its teachings on cleaning system compensation mechanisms, describes a grain cleaning side-shaking mechanism which provides compensation to the cleaning system when the combine experiences a change in inclination (i.e. harvesting on uneven terrain). Other side-shaking mechanisms are described in U.S. Pat. No. 4,736,753; U.S. Pat. No. 7,927,199; and U.S. Pat. No. 7,322,882, which are also incorporated herein for their teachings on cleaning system compensation mechanisms. Conventional side-shaking mechanisms, do not affect any changes to the 2-dimensional (fore/aft/vertical) movement of the cleaning system on flat ground. On inclined ground, however, the side-shaking mechanisms introduce an additional side-to-side component in the shake geometry of a sieve, causing material to resist its natural tendency to migrate to the lower side of the sieve and remain more evenly distributed across the width of the sieve, providing a more efficient cleaning system.

Crop material may also be distributed unevenly in the cleaning system during flat ground operation. Accordingly, an improved system is needed to more evenly distribute the crop material across the width of the sieve during flat ground operation. Further to this, the controls of conventional side-shake system operating levels are based on algorithms relating directly to the inclination of terrain. The controlling logic for the side-shake compensation may not always result in evenly distributed grain across the width of the cleaning system due to a number of factors incremental to ground inclination.

SUMMARY

Embodiments are directed to a combine side-shaking control system for use with a combine. The control system includes a sieve for separating crop material from other materials and a movable side-shaking mechanism coupled to the sieve and configured to move the sieve in a side-to-side motion. The control system also includes also includes a first grain loss sensor configured to sense a first amount of grain loss from a first portion of the sieve and a second grain loss sensor spaced from the first grain loss sensor and configured to sense a second amount of grain loss from a second portion of the sieve. The control system further includes a controller configured to: (i) receive a first grain loss value corresponding to the sensed first amount of grain loss and a second grain loss value corresponding to the sensed second amount of grain loss; and (ii) cause the side-shaking mechanism to control movement of the sieve in the side-to-side motion based on at least one of the received first grain loss value and the received second grain loss value.

According to one embodiment, the sieve extends a width between a right edge of the sieve and a left edge of the sieve and comprises a left portion and a right portion, the first grain loss sensor is located proximate to the left edge of the sieve and configured to sense the first amount of grain loss from the left portion of the sieve, and the second grain loss sensor is located near the right edge of the sieve and configured to sense the second amount of grain loss from the right portion of the sieve.

According to another embodiment, the control system further includes a comparator configured to compare the first grain loss value to the second grain loss value to obtain a grain loss difference value. The controller is further configured to cause the side-shaking mechanism to control movement of the sieve based on the grain loss difference value.

According to an aspect of an embodiment, the controller is further configured to determine whether the grain loss difference value is equal to or greater than a predetermined grain loss difference threshold and cause the side-shaking mechanism to: (i) increase the distance of the sieve in the side-to-side motion when the grain loss difference value is equal to or greater than the predetermined grain loss difference threshold; and (ii) decrease the distance of the sieve in the side-to-side motion when the grain loss difference value is less than the predetermined grain loss difference threshold.

In one embodiment, the control system further includes a comparator configured to compare: (i) the first grain loss value to a predetermined grain loss threshold value; and (ii) the second grain loss value to the predetermined grain loss threshold value. The controller is further configured to cause the side-shaking mechanism to: (i) increase the distance of the sieve in the side-to-side motion when the first grain loss value is equal to or greater than the predetermined grain loss threshold value; or (ii) decrease the distance of the sieve in the side-to-side motion when the second grain loss value is less than the predetermined grain loss threshold value.

In another embodiment, the controller is further configured to automatically cause the side-shaking mechanism to control movement of the sieve in the side-to-side motion when the combine is on substantially flat ground.

In yet another embodiment, the controller is further configured to cause the side shaking mechanism to change the distance of the sieve in the side-to-side motion based on at least one of the received first grain loss value and the received second grain loss value.

Embodiments are directed to a combine side-shaking control system. The control system includes a sieve for separating crop material from other materials and a movable side-shaking mechanism coupled to the sieve and configured to move the sieve in a side-to-side motion. The control system also includes a first grain loss sensor configured to sense a first amount of grain loss from a first portion of the sieve and a second grain loss sensor spaced from the first grain loss sensor and configured to sense a second amount of grain loss from a second portion of the sieve. The control system further includes a grain loss indicator configured to indicate: (i) the first amount of grain loss from the first portion of the sieve; and (ii) the second amount of grain loss from the second portion of the sieve.

According to one embodiment, the control system further includes a controller configured to cause the first amount of grain loss and the second amount of grain loss to be indicated by the grain loss indicator.

According to another embodiment, the grain loss indicator is a display and the controller is further configured to cause the first amount of grain loss and the second amount of grain loss to be displayed on the display.

In one embodiment, the grain loss indicator is an audio indicator and the controller is further configured to cause the first amount of grain loss and the second amount of grain loss to be aurally indicated by the audio indicator.

In another embodiment, the controller is further configured to (i) receive an input via a user interface to control the movement of the side-shake mechanism; and (ii) control the side-shake mechanism to move the sieve in the side-to-side motion responsive to the received input.

According to an aspect of an embodiment, a portion of the display is a touch screen that includes the user interface.

According to one embodiment, the control system further includes a comparator configured to compare the first amount of grain loss to the second amount of grain loss to obtain a grain loss difference. The controller is further configured to (i) determine whether the grain loss difference is equal to or greater than a predetermined grain loss difference threshold; and (ii) cause the grain loss indicator to prompt a user to control the movement of the side-shake mechanism via the user interface based on whether the grain loss difference is determined to be equal to or greater than a predetermined grain loss difference threshold.

Embodiments are directed to a method for controlling operation of a side-shaking mechanism in a combine. The method includes enabling the side-shaking mechanism and moving the side-shaking mechanism to a predetermined zero position. The method also includes receiving incline data, from an incline sensor, representing the inclination of the combine and receiving sensed data, from at least one sensor, representing at least one operating condition of a combine system. The method further includes, based on the incline data and the sensed data, causing the side-shaking mechanism to (i) increase the distance of movement of the at least one sieve in the side-to-side motion; or (ii) decrease the distance of movement of the at least one sieve in the side-to-side motion.

According to one embodiment, the predetermined zero position corresponds to a position of the side-shaking mechanism substantially centered between first and second side limits of the side-to-side motion, and the incline data indicates a first distance for moving the side-shaking mechanism away from the predetermined zero position on each side. The method further comprises receiving side-shaking mechanism bias data indicating a second distance for moving the side-shaking mechanism away from the predetermined zero position on each side. Causing the side-shaking mechanism to (i) increase the distance of movement of the at least one sieve in the side-to-side motion; or (ii) decrease the distance of movement of the at least one sieve in the side-to-side motion is based on the incline data, the sensed data and the side-shaking mechanism bias data.

According to another embodiment, the method further includes disabling the side-shaking mechanism. Causing the side-shaking mechanism to (i) stop moving at least one sieve in the side-to-side motion or (ii) start moving the at least one sieve in a side-to-side motion is based on the side-shaking mechanism bias data if the side-shaking mechanism is disabled and the sensed data, the incline data and the side-shaking mechanism bias data if the side-shaking mechanism is enabled.

According to an aspect of an embodiment, receiving data indicating whether an operational system speed has reached a predetermined speed threshold value includes receiving a compared engine speed value indicating whether a speed of the combine engine has reached a predetermined percentage of a high idle speed of the combine engine.

According to another aspect of an embodiment, receiving data indicating whether an operational system speed has reached a predetermined speed threshold value includes receiving a compared cleaning system speed value indicating whether a speed of the combine cleaning system has reached a predetermined percentage of a high idle speed of the combine engine.

According to yet another aspect of an embodiment, receiving data indicating whether a rate of crop flow has reached a predetermined threshold value comprises receiving a compared crop flow value indicating whether a rate of crop flow has reached a predetermined percentage of a combine system flow capacity.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following
Figures

DETAILED DESCRIPTION OF ILLUSTRATED EMBODIMENTS

Typically the side-shaking mechanism and its controlling electronics are activated and become fully operational concurrent with enabling the combine separator functions. As described above, the side-shaking mechanisms in conventional combines may be engaged to more evenly distribute crop material across the width of the sieve when the combine is on inclined ground. For example, the side-shaking mechanisms may be engaged based on sensed information from an inclinometer. Unevenly distributed crop material in the cleaning system may also be caused by factors other than a change in inclination. For example, the rotation of the combine threshing rotor in one rotational direction may cause the material to be distributed more on one side of the cleaning system than the other side of the cleaning system, regardless of whether the combine is on inclined or flat ground. A greater amount of grain loss (grain carried out of the combine) may occur on the side of the cleaning system having the larger amount of distributed material than the other side of the cleaning system having a smaller amount of distributed material.

Embodiments of the present invention are directed to an improved method and system for evenly distributing crop material in the cleaning system during flat ground operation and inclined operation. Embodiments utilize grain loss sensors in the cleaning system and one or more side shaking mechanisms to determine uneven distribution of crop material in the cleaning system. Aspects of embodiments determine uneven distribution of crop material in the cleaning system based on disproportionate grain loss between the left side and right side of the combine.

Embodiments include a controller to automatically engage and effect a change in operational level of the side shaking mechanism [linear side-to-side displacement of sieve] based on grain loss sensed by the grain loss sensors, in addition to any correction made automatically for ground inclination compensation. Embodiments include indicating grain loss conditions on opposite sides of the cleaning system that are sensed by the grain loss sensors.

Figure 1:
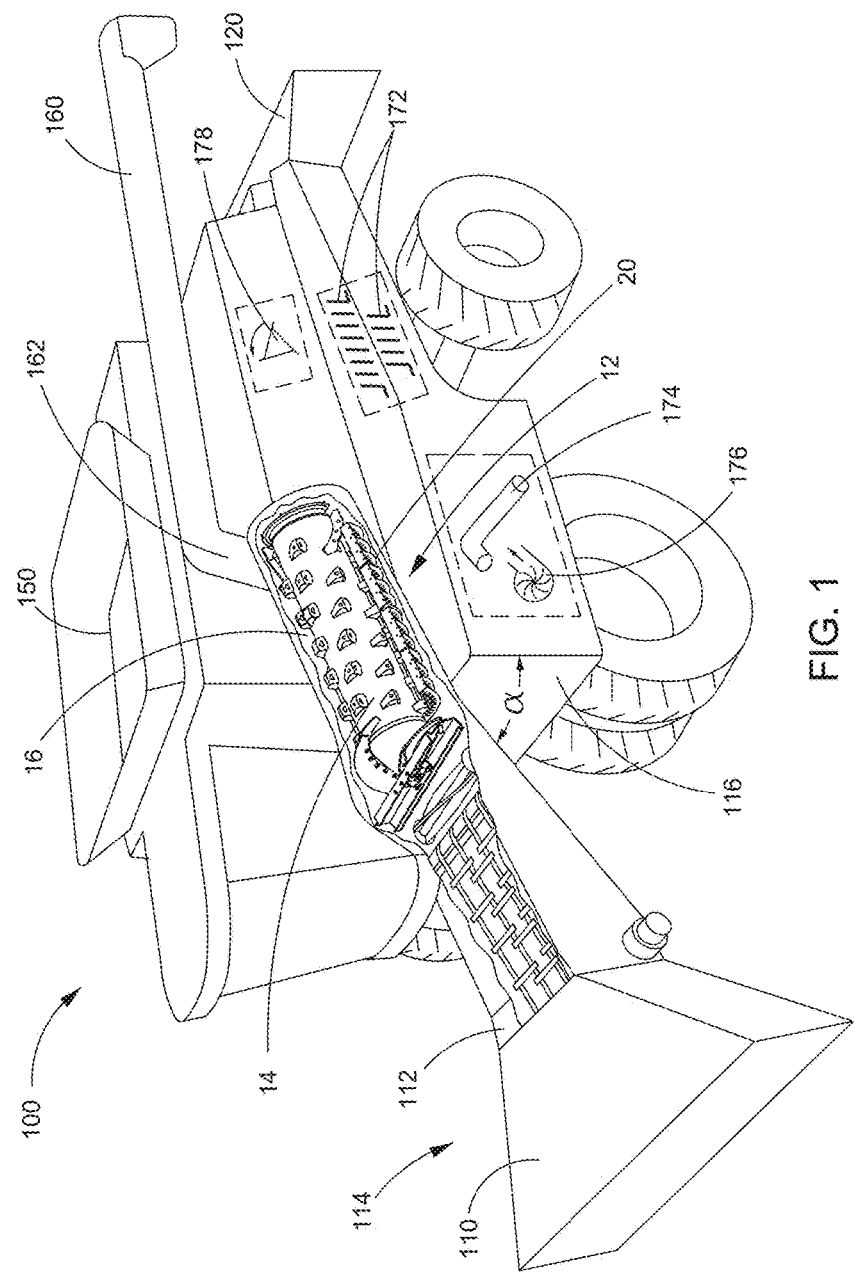
FIG. 1 illustrates a perspective view of an exemplary combine for use with embodiments of the present invention.

FIG. 1 through FIG. 3B shows exemplary agricultural combines in which exemplary embodiments of the present invention may be implemented. FIG. 1 shows an exemplary agricultural combine 100, which may also be referred as a combine or harvester throughout this specification. As shown in FIG. 1, the combine 100 may include a combine frame 116 and a feeding system 114, having a header 110 and a movable feeding mechanism 112. The movable feeding mechanism may have a position which includes an angle α relative to a portion of the combine frame 116. Combine 100 may also include a longitudinally axially arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG (material other than grain) such as, for example, husks, cobs, pods, and the like, and the separated materials may be carried away from the threshing and separation system 12 in a well-known conventional manner. Crop residue can be redistributed to the field via a spreader 120, located at the back of the harvester.

The remaining threshed crop, which includes the grain to be collected, is then cleaned via a cleaning system. The cleaning system can include conventional winnowing mechanisms, including a fan 176 that blows air across a series of reciprocating sieves 172. Through the winnowing action of the air and the reciprocating sieves 172, clean grain may be collected and sorted from the remaining chaff. Crop-handling systems, which include augers and elevators, may be used to transport cleaned crop, such as grain, to a grain tank 150 and from the grain tank 150 to a grain cart (not shown). Crop-handling systems may also transport tailings materials back to the cleaning system/threshing system through tailings elevator 174. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160, representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 is replaced by an unload conveying auger that is attached to the one or more cross augers conveying grain from the cleaning system and may pivot from side to side from the combine 100, conveying grain from the combine 100.

Figure 2:
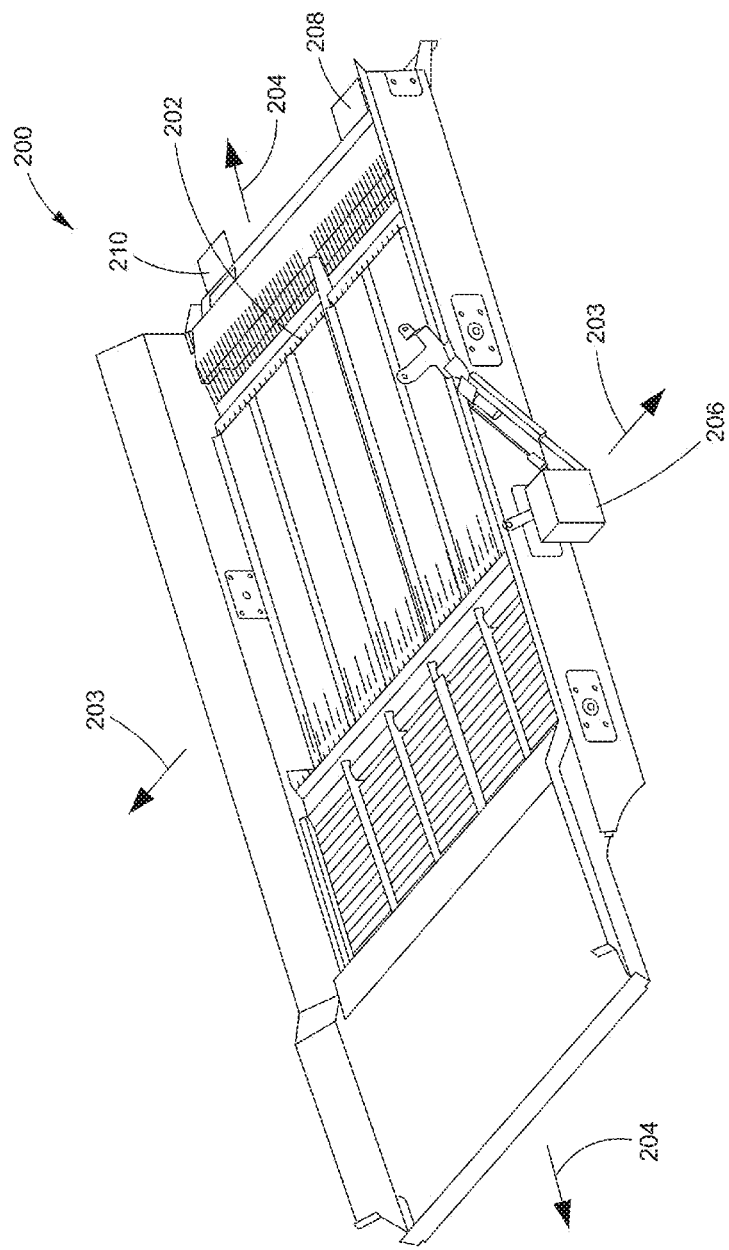
FIG. 2 is a perspective view of an exemplary cleaning system for use with embodiments of the present invention.

FIG. 2 illustrates an exemplary cleaning system 200 for use with embodiments of the present invention. As shown at FIG. 2, cleaning system 200 may include sieve 202, for separating crop material, such as grain, from other materials (MOG). Arrows 204 represent the fore/aft movement of sieve 202. Cleaning system 200 may also include side-shaking mechanism 206 coupled to the at least one sieve 202 and configured to move sieve 202 in a side-to-side motion indicated by arrows 202. Arrows 204 represent the fore/aft movement of sieve 202. In some embodiments, the side-to-side motion of sieve 202 may include movement in an arc or in a substantially diagonal motion. Embodiments may include any number of sieves and any number of side-shaking mechanisms. It is also contemplated that a single side-shaking mechanism, such as side-shaking mechanism 206, may be coupled to multiple sieves. The geometry of the sieve 202 and side-shaking mechanism 206 shown at FIG. 2 is merely exemplary. Other embodiments may include cleaning systems having different geometries.

As shown at FIG. 2, cleaning system 200 may also include a plurality of grain loss sensors, such as left side grain loss sensor 208 and right side grain loss sensor 210 located at opposite sides of the sieve 202 to monitor grain loss on the left side and right side of the cleaning system 200. The geometry and location of the left side grain loss sensor 208 and right side grain loss sensor 210 shown in FIG. 2 are merely exemplary. Other embodiments may include grain loss sensors of different geometries and at different locations to monitor grain loss of cleaning systems. Embodiments may also include more than two grain loss sensors.

As described above, a greater amount of grain loss (grain carried out of the combine) may occur on the side of the cleaning system having the larger amount of distributed material than the other side of the cleaning system having a smaller amount of distributed material. For example, then a larger amount of material is distributed on the left side of sieve 202 than the right side sieve 202, left side grain loss sensor 208 may sense a larger amount of grain loss than right side grain loss sensor 210. Accordingly, left side grain loss sensor 208 and right side grain loss sensor 210 may be used to determine uneven distribution on one or more sieves, such as sieve 202, of a cleaning system 200. Grain loss sensors may include mechanical, electrical or optical components and may monitor changes in pressure, mass, weight, volume and other parameters.

Figure 3A:
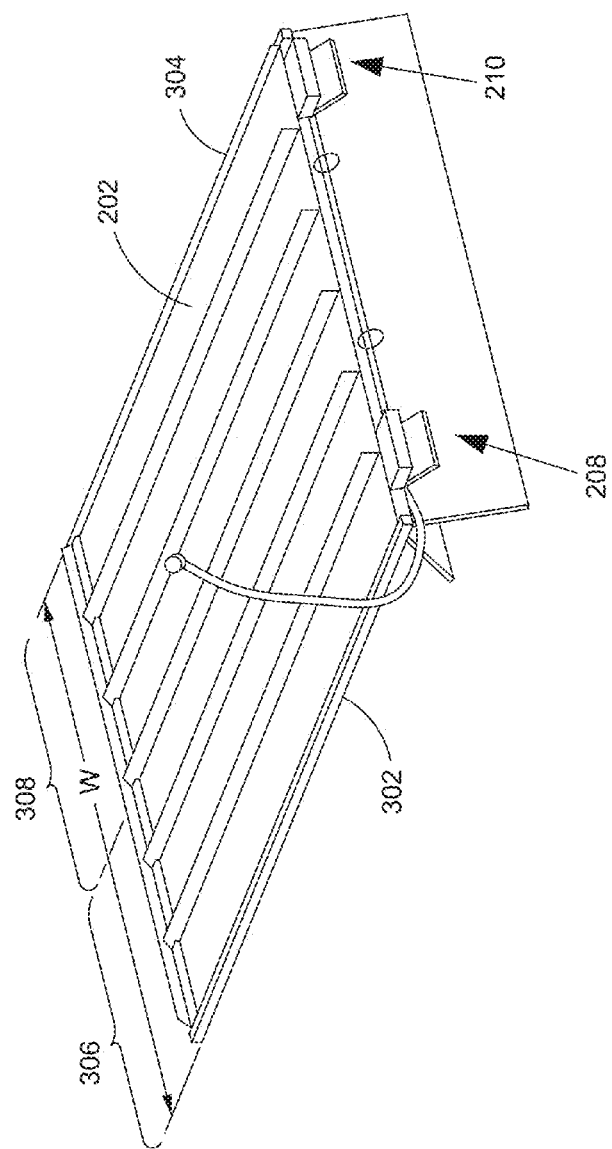
FIG. 3A is a perspective view of an exemplary sieve having right and left grain loss sensors for use with embodiments of the present invention.
Figure 3B:
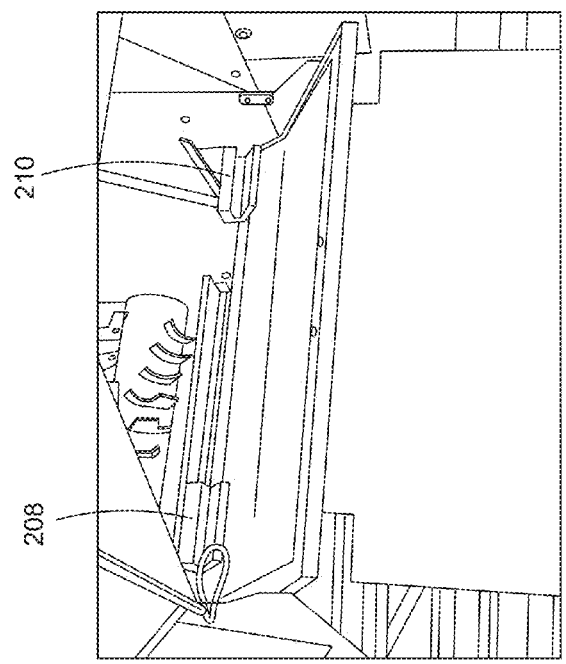
FIG. 3B is a perspective view of a rear portion of an exemplary cleaning system illustrating right and left grain loss sensors for use with embodiments of the present invention.

FIG. 3A and FIG. 3B are different views illustrating a left side grain loss sensor 208 and a right side grain loss sensor 210 to monitor grain loss on the left side and right side of cleaning system 200. FIG. 3A is a perspective view of sieve 202 and left side grain loss sensor 208 and a right side grain loss sensor 210 shown in FIG. 2. As shown at FIG. 3A, the sieve 202 extends a width W between a left edge 302 of the sieve 202 and a right edge 304 of the sieve 202 and comprises a left portion 306 and a right portion 308. The first grain loss sensor 208 is located proximate to the left edge 302 of the sieve 202 and is configured to sense the amount of grain loss from the left portion 306 of the sieve 202. The second grain loss sensor 210 is located near the right edge 304 of the sieve 202 and configured to sense the amount of grain loss from the right portion 308 of the sieve 202. FIG. 3B is a perspective view of a rear portion cleaning system 200 illustrating left side grain loss sensor 208 and a right side grain loss sensor 210.

Figure 4:
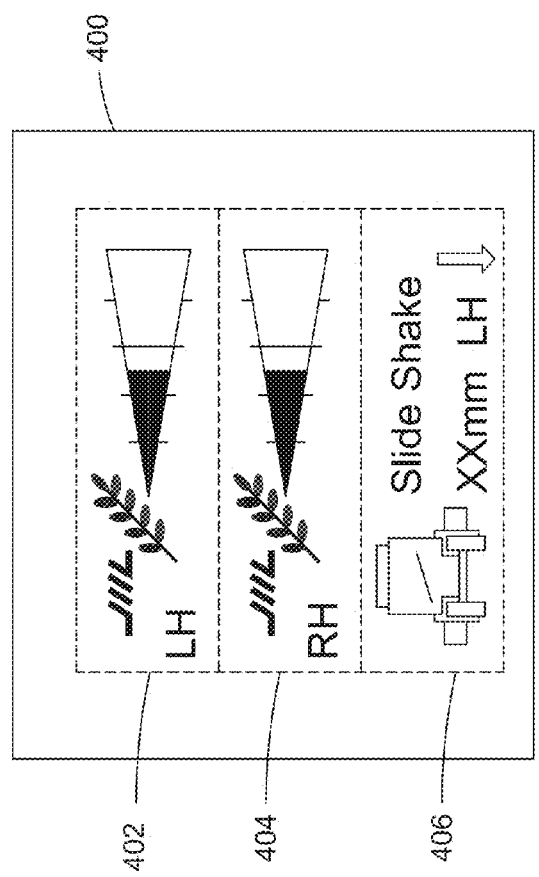
FIG. 4 is an exemplary display illustrating a visual indication of grain loss by left and right side grain loss sensors for use with embodiments of the present invention.
Figure 5:
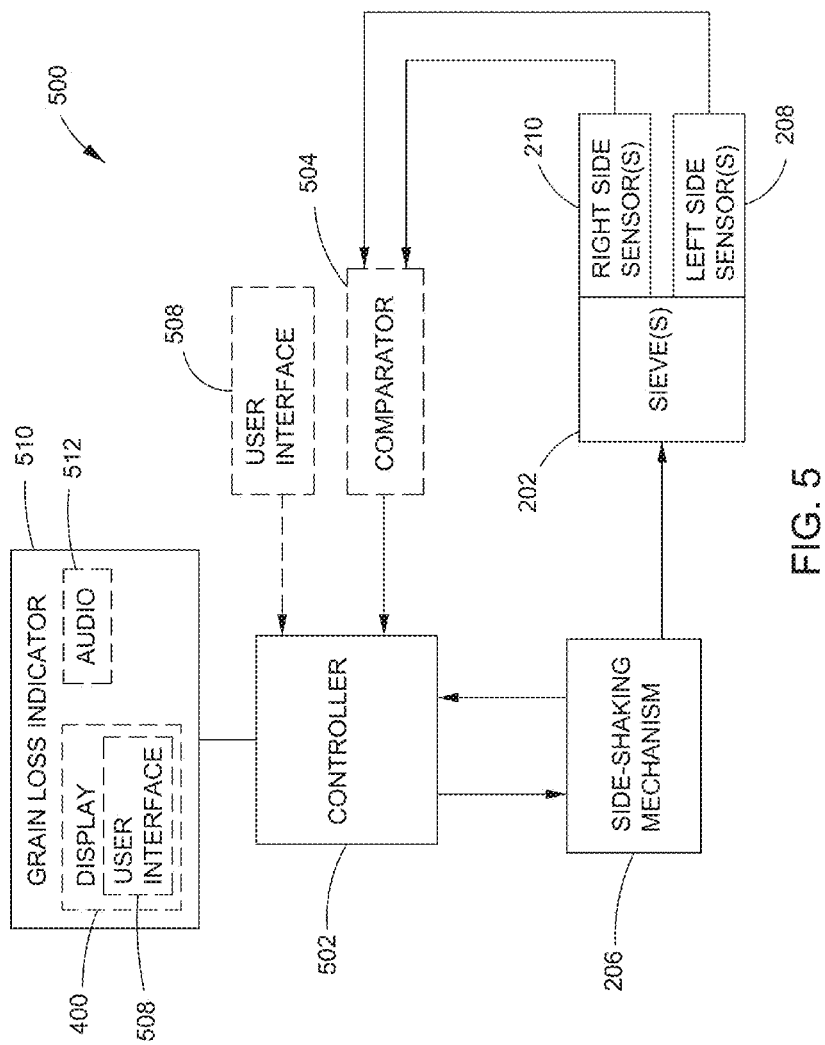
FIG. 5 is a block diagram illustrating an exemplary side-shaking control system for use with embodiments of the present invention.

In some embodiments, a combine operator interface system [e.g. in-cab display] may include a grain loss indicator configured to indicate: (i) the first amount of grain loss from the first portion of the sieve; and (ii) the second amount of grain loss from the second portion of the sieve. In some aspects, a grain loss indicator may be a display indicating grain loss by left side grain loss sensor 208 and grain loss by right side grain loss sensor 210. FIG. 4 is a display 400 illustrating a visual indication of grain loss by left side grain loss sensor 208 and grain loss by right side grain loss sensor 210. Grain loss may be measured as a rate of grain loss in real time and over predetermined intervals. As shown in FIG. 4, the display 400 may include a portion 402 indicating grain loss by left side grain loss sensor 208 and a portion 404 indicating grain loss by right side grain loss sensor 210. In some embodiments, displays may indicate whether grain loss by left side grain loss sensor 208 and right side grain loss sensor 210 has reached or exceeded a predetermined grain loss threshold. In some embodiments, displays may indicate whether the difference between the grain loss by left side grain loss sensor 208 and the grain loss by right side grain loss sensor 210 has reached or exceeded a predetermined grain loss difference threshold. The display 400 may include a portion 406 indicating whether the side shaking mechanism is engaged. In some aspects, an operating level (e.g., linear side-to-side displacement of sieve, percent of full side-to-side displacement, [ground] inclination angle of compensation, etc.) of the side shaking mechanism 206 may be displayed. For example, as shown in FIG. 4 the portion 406 shows the operating level (e.g., linear side-to-side displacement of sieve) of the side shaking mechanism 206. The level of the side shaking mechanism 206 may range from no side-to-side movement to maximum side-to-side movement. As shown in FIG. 5, controller 502 receives input from an inclinometer which measures the angle of ground inclination. The adjustment of the side-shake mechanism 206 is governed by pre-programmed software in controller 502 which adjusts the operating level based on the ground inclination. However, a deficiency in this closed loop adjustment is that it does not take into account the actual level of losses from the sieve 202 and specifically any differential in grain loss that may arise across the width as measured by LH sensor 208 and RH sensor 210. In some embodiments, the level of losses processed by the comparator 504, which may be part of controller 502 could generate an incremental adjustment to the side-shake mechanism 206 [e.g., additional correction to the ground inclination algorithm] through automatic adjustment within the controller 502.

In some embodiments, combine side-shaking control systems may include a user interface 508 (shown at FIG. 5). In some embodiments, the level of losses displayed in the user interface 508 may be used to manually control or bias the movement of the side-shake mechanism 206. For example, the user interface may be used to manually cause the side-shaking mechanism 206 to stop moving sieve 202 in the side-to-side motion, start moving sieve 202 in the side-to-side motion and move the sieve 202 at a different level of operation than dictated by the ground inclination algorithm. The user interface 508 may include an electrical switch, button, lever, or other selectable item. In some embodiments, display 400 may be a touch screen display that includes the user interface 508. For example, a portion 406 of display 400 shown at FIG. 4 may be a touch screen display. Controller 502 (shown in FIG. 5) may receive an input via a user interface to control the movement of the side-shake mechanism 206 and control the side-shake mechanism 206 to move sieve 202 in the side-to-side motion responsive to the received FIG. 5 is a block diagram illustrating an exemplary side-shaking control system 500. As shown in FIG. 5, control system 500 may include left side grain loss sensor 208 and a right side grain loss sensor 210 and a controller 502 for receiving respective grain loss values from the grain loss sensors 208 and 210 and controlling the movement of the side-shaking mechanism 206 based on at least one of the received respective grain loss values. Controlling the movement of the side-shaking mechanism 206 may include causing the side-shaking mechanism 206 to: (i) decrease the distance of the movement of the sieve 202 in the side-to-side motion; or (ii) increase the distance of the movement of the sieve 202 in the side-to-side motion.

As shown at FIG. 5, control system 500 may also include a comparator 504 configured to compare sensed data received from left side grain loss sensor 208 and first grain loss sensor 210. In some embodiments, controller 502 may include the comparator 504. In other embodiments, comparator 504 may be separate from controller 502 and provide compared values to controller 502.

In some embodiments, comparator 504 may be configured to compare sensed grain loss values from the left side grain loss sensor 208 to sensed grain loss values from the right side grain loss sensor 210 to obtain a compared grain loss value. Controller 502 may then determine whether the compared grain loss value is equal to or greater than a predetermined grain loss difference threshold. The incremental adjustment to the side-shake mechanism 206 [e.g., additional correction to the ground inclination algorithm] may be controlled based on whether the compared grain loss value is equal to or greater than a predetermined grain loss difference threshold. For example, controller 502 may cause the side shaking mechanism 206 to increase the distance of the sieve 202 in the side-to-side motion when the compared grain loss value is equal to or greater than the predetermined grain loss difference threshold. Controller 502 may also cause the side-shaking mechanism 206 to decrease the distance (including reducing to a zero distance) of the sieve 202 in the side-to-side motion when the compared grain loss value is less than the predetermined grain loss difference threshold.

In some embodiments, comparator 504 may be configured to compare sensed grain loss values from at least one of the left side grain loss sensor 208 and the right side grain loss sensor 210 to predetermined grain loss threshold values to produce respective compared grain loss values. Controller 502 may then receive the compared data from comparator 504 and cause side-shaking mechanism 206 to increase the distance (including increasing from zero distance) of the at least one sieve 202 in the side-to-side motion based on at least one of the respective compared grain loss values. For example, controller 502 may cause side-shaking mechanism 206 to increase the distance of the at least one sieve 202 if the compared grain loss value is equal to or greater than the predetermined grain loss values. Controller 502 may also cause side-shaking mechanism 206 to decrease the distance of the sieve in the side-to-side motion if the compared grain loss value is less than the predetermined grain loss threshold value. For example, controller 502 may receive a compared grain loss value indicating the grain loss value from left side grain loss sensor 208 is equal or greater than a threshold grain loss value indicating that material is disproportionately distributed higher on left portion 306 of sieve 202. Controller 502 may then cause the side-shaking mechanism 206 to start moving at least one sieve 202 in a side-to-side motion at a different distance of the sieve in the side-to-side motion to more evenly distribute the material across the width W of sieve 202.

As shown at FIG. 5, control system 500 may also include a grain loss indicator 510 configured to indicate: (i) the first amount of grain loss from the first portion 306 of the sieve 202; and (ii) the second amount of grain loss from the second portion 308 of the sieve 202. In some embodiments, grain loss indicator 510 may be a display, such as display 400 shown at FIG. 4. In some embodiments, grain loss indicator 510 may be an audio indicator configured to aurally indicate: (i) the first amount of grain loss from the first portion 306 of the sieve 202; and (ii) the second amount of grain loss from the second portion 308 of the sieve 202. In some aspects, the grain loss indicator 510 (either via display 400 or audio indicator 512) may indicate whether the difference in grain loss between the left portion 306 and right portion 308 of the sieve 202 is equal to or greater than a predetermined grain loss difference threshold, prompting the operator to manually cause the side shaking mechanism 206 to move sieve 202 in the side-to-side motion via user interface 508. In some aspects, the grain loss indicator 510 (either via display 400 or audio indicator 512) may indicate whether the difference in grain loss between the left portion 306 and right portion 308 of the sieve 202 is less than a predetermined grain loss difference threshold, prompting the operator to manually cause the side shaking mechanism 206 to stop moving sieve 202 in the side-to-side motion via user interface 508.

In yet other aspects, controller 502 may cause the grain loss indicator 510 (either via display 400 or audio indicator 512) to prompt the operator to control the movement of the side-shake mechanism 206 via the user interface 508 based on whether the grain loss difference is determined to be equal to or greater than a predetermined grain loss difference threshold.

Figure 6:
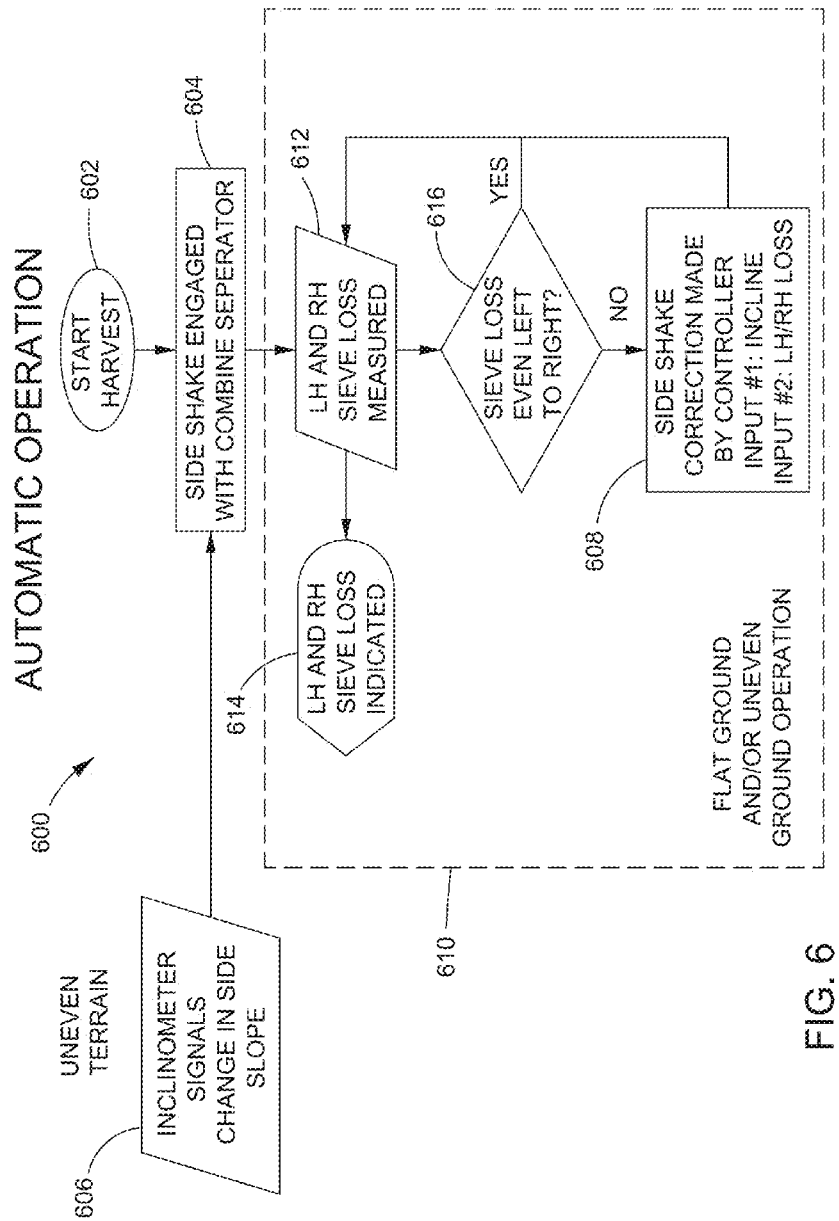
FIG. 6 is a flow diagram illustrating an exemplary method for automatically controlling operation of a side-shaking mechanism in a combine for use with embodiments of the present invention.

FIG. 6 is a flow diagram illustrating an exemplary method for automatically controlling operation of a side-shaking mechanism in a combine. As shown at 602 and 604, harvesting may begin and the side-shaking mechanism may be engaged. In some embodiments, engagement of the side-shaking mechanism may include a state where the side-shake mechanism is enabled but the sieve 202 is not caused to move in the side-to-side motion as a result of a ground inclination reading of zero. In other embodiments, engagement of the side-shaking mechanism may include causing the sieve to move in the side-to-side motion as a result of a ground inclination reading a value other than zero.

As described above, on inclined ground, the side-shaking mechanism may introduce a side-to-side component in the shake geometry of a sieve, causing material to resist its natural tendency to migrate to the lower side of the sieve and remain more evenly distributed across the width of the sieve. For example, as shown at 606, an inclinometer may be used to signal a change in inclination. Other types of sensors may also be used to determine changes in inclination. Responsive to a change in inclination, the side shake may be engaged with the combine separator at 604. In some embodiments, the side-shaking correction may include controlling a side-shaking mechanism 206 (e.g., side-shaking mechanism 206) to cause a sieve (e.g., sieve 202) to move from a zero distance of the sieve in the side-to-side motion to any one of a plurality of distances. In other embodiments, the side-shaking correction may include causing the sieve to move from one side-to-side motion distance to another side-to-side motion distance (e.g. reduce or increase side-to-side motion distance).

Unevenly distributed crop material in the cleaning system may also be caused by factors during flat ground operation (e.g., no change in inclination). For example, the rotation of the combine threshing rotor in one rotational direction may cause the material to be distributed more on one side of the cleaning system than the other side of the cleaning system during flat ground operation. A greater amount of grain loss (grain carried out of the combine) may occur on the side of the cleaning system having the larger amount of distributed material than the other side of the cleaning system having a smaller amount of distributed material. Accordingly, as shown in block 610 of FIG. 6, the method may include automatically causing a side-shaking correction 608 to more evenly distribute the material in the cleaning system (e.g. across the width W of sieve 202).

At block 612, the left hand side and right hand side loss may be measured (e.g. sensed by sensors 208 and 210). As shown at 614, in some embodiments the left hand side and right hand side loss may be indicated (e.g., by a grain loss indicator 510 shown at FIG. 5). In some aspects, the left hand side loss and right hand side loss may be displayed (e.g., by display 400 shown at FIG. 4). At decision point 616, it may be automatically determined whether the left hand side loss and right hand side loss are equal or within a threshold range. For example, comparator 504 may be configured to compare sensed grain loss values from the left side grain loss sensor 208 to sensed grain loss values from the right side grain loss sensor 210 to obtain a compared grain loss value. Controller 502 may then automatically determine whether the compared grain loss value is equal to or greater than a predetermined grain loss difference threshold. If the left hand side loss and right hand side loss are determined to be equal or the difference between the losses are equal to or less than a predetermined threshold range, no side-shake correction may be made. The method proceeds back to 612 and 616 to automatically determine whether the left hand side loss and right hand side loss are equal or within a threshold range. If the difference between the losses is determined to be greater than a predetermined threshold range, however, an automatic side-shake correction 608 may be made to more evenly distribute the material in the cleaning system. The method may again proceed back to 612 and 616 to automatically determine whether the left hand side loss and right hand side loss are equal or within a threshold range.

Figure 7:
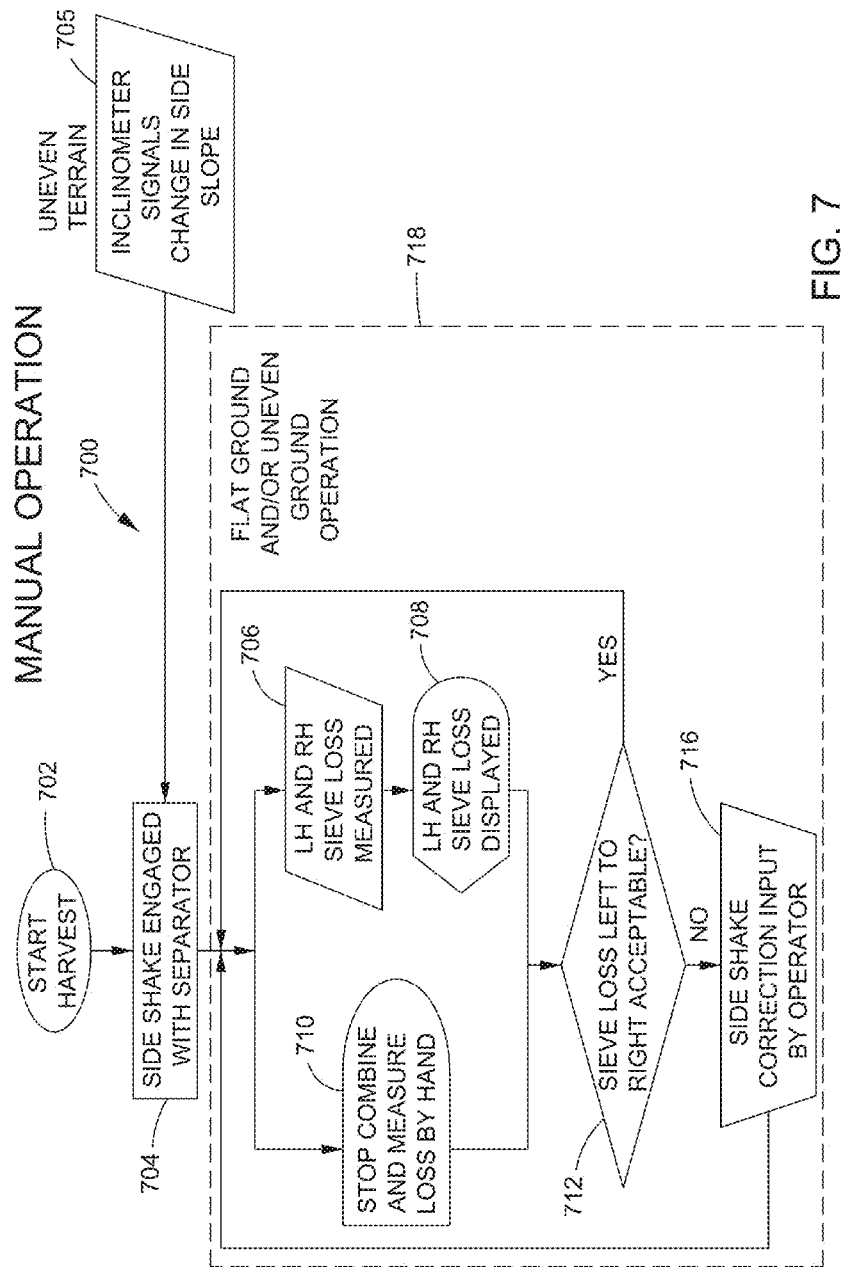
FIG. 7 is a flow diagram illustrating an exemplary method for manually controlling operation of a side-shaking mechanism in a combine for use with embodiments of the present invention.

In some embodiments, a side-shaking mechanism may be manually controlled during flat ground operation. FIG. 7 is a flow diagram illustrating an exemplary method for manually controlling operation of a side-shaking mechanism in a combine. As shown at 702 and 704, harvesting may begin and the side-shaking mechanism may be engaged. As described above with reference to FIG. 6, the engagement of the side-shaking mechanism during manual operation may also include a state where the side-shake mechanism is enabled but the sieve 202 is not caused to move in the side-to-side motion. In other embodiments, engagement of a side shaking mechanism may include causing the sieve to move in the side-to-side motion at any one of a plurality of distances.

During flat ground operation, as shown at block 718, the side-shake correction may be manually input by an operator based on grain loss in the cleaning system. At block 706 and 708, the left hand side and right hand side loss may be measured (e.g., by sensors 208 and 210) and the losses may be indicated (e.g., by a grain loss indicator 510 shown at FIG. 5).

In some aspects, the left hand side loss and right hand side loss may be displayed (e.g., by display 400 shown at FIG. 4). Other indications, such as an audio indication, may also be used.

As shown at 710, the left hand side and right hand side loss may also be manually measured. For example, an operator may stop harvesting, and visually observe the left hand side and right hand side loss in the cleaning system.

At decision point 712, the operator may manually determine whether a difference between the left hand side loss and the right hand side loss is acceptable. If the operator manually determines that the difference in losses is acceptable, the method may proceed back to 612 and 616 to measure the left hand side loss and the right hand side loss at 706 or 708. If the operator manually determines that the difference in losses is not acceptable, a side-shake correction 716 may be manually input to more evenly distribute the material in the cleaning system. The method may then proceed back to 612 and 616 to measure the left hand side loss and the right hand side loss at 706 or 708.

Figure 8:
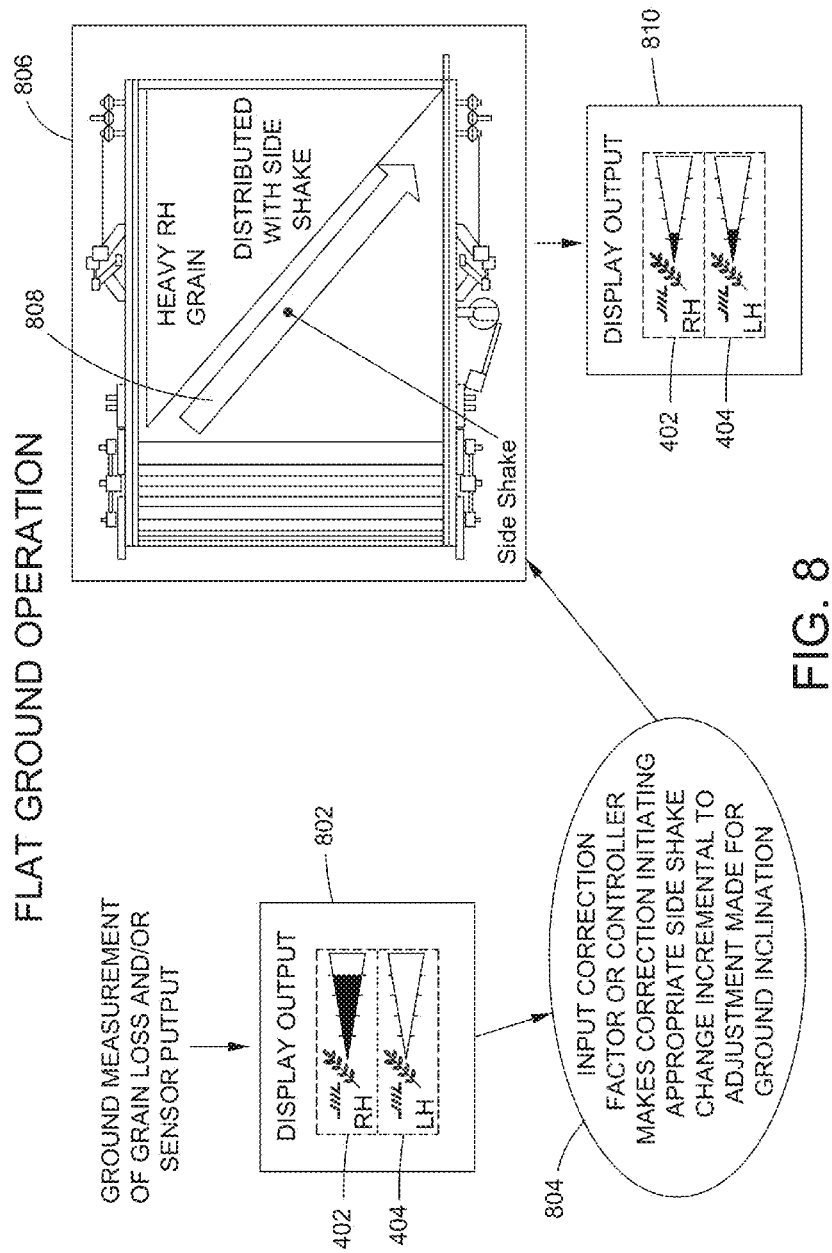
FIG. 8 is a system flow diagram illustrating an example of side-shake correction during flat ground operation in accordance with an embodiment of the invention.

FIG. 8 is a system flow diagram illustrating an example of side-shake correction during flat ground operation. For example, as shown at 802, the first amount of grain loss and the second amount of grain loss may be indicated on a display (e.g., display 400 shown at FIG. 4). When material is being unevenly distributed more on the right side 308 of sieve 202 than on the left side 306 of sieve 202, display 400 may show a higher amount of right side grain loss at portion 402 than left side gain loss at portion 404, as shown in display 400 in FIG. 8.

A correction factor may be introduced based on a difference between the right side grain loss at portion 402 and the left side gain loss at portion 404, as shown at 804. In some embodiments, a controller (e.g., controller 502) may automatically make a side-shake correction. In other embodiments, a side-shake correction may be manually input by an operator. For example, when the operator sees that display 400 shows a higher amount of right side grain loss at portion 402 than left side gain loss at portion 404, the operator may engage the side-shaking mechanism 206 (or increase the speed of the side-shaking mechanism) via the user interface

508, causing the sieve 202 to move in the side-to-side motion. In some embodiments, in addition to displaying the first amount of grain loss and the second amount of grain loss, the operator may also be prompted to engage the side-shaking mechanism 206 when the grain loss difference is determined to be equal to or greater than a predetermined grain loss difference threshold. Accordingly, after the prompt, the operator may engage the side-shaking mechanism 206 (or increase the level of the side-shaking mechanism) via the user interface 508.

As shown at 806, a side-shaking mechanism (e.g., side-shaking mechanism 206) may include causing the sieve 202 to increase or decrease movement in the side-to-side motion, indicated by arrow 808, causing the grain to be distributed more evenly on the right side 308 of sieve 202 and on the left side 306 of sieve 202.

When grain is again being distributed more evenly, display 400 may show the same (or substantially the same) right side grain loss at portion 402 as the left side gain loss at portion 404, as shown at 810. In some embodiments, the operator may manually input a correction to the side-shake via the user interface 508 if the displayed difference between the right side grain loss and left side gain loss is acceptable.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A combine side-shaking control system for use with a combine, comprising:
   a sieve for separating crop material from other materials;
   a movable side-shaking mechanism coupled to the sieve, the side-shaking mechanism being configured to move the sieve in a side-to-side motion;
   a first grain loss sensor configured to sense a first amount of grain loss from a first portion of the sieve;
   a second grain loss sensor spaced from the first grain loss sensor and configured to sense a second amount of grain loss from a second portion of the sieve;
   an inclinometer configured to sense an incline of the combine and produce an incline value representative of an angle of ground inclination upon which the combine is traversing; and
   a programmed controller connected to the first and second grain loss sensors and the inclinometer to receive information therefrom, and operatively connected to the side shake mechanism;
   the programmed controller configured to: (i) receive the incline value; (ii) receive a first grain loss value corresponding to the sensed first amount of grain loss; (iii) receive a second grain loss value corresponding to the sensed second amount of grain loss; and (iv) control movement of the sieve in the side-to-side motion by way of the side-shaking mechanism dependent upon the incline value, and a grain loss difference value calculated by taking a difference between the first grain loss value and the second grain loss value.

2. The side-shaking control system of claim 1, wherein, the sieve extends a width between a right edge of the sieve and a left edge of the sieve and comprises a left portion and a right portion, the first grain loss sensor is located proximate to the left edge of the sieve and configured to sense the first amount of grain loss from the left portion of the sieve, and the second grain loss sensor is located near the right edge of the sieve and configured to sense the second amount of grain loss from the right portion of the sieve.

3. The side-shaking control system of claim 1, further comprising:
   a comparator configured to compare the first grain loss value to the second grain loss value to obtain the grain loss difference value.

4. The side-shaking control system of claim 3, wherein, the programmed controller is further configured to determine whether the grain loss difference value is equal to or greater than a predetermined grain loss difference threshold and cause the side-shaking mechanism to: (i) increase the distance of the sieve in the side-to-side motion when the grain loss difference value is equal to or greater than the predetermined grain loss difference threshold; and (ii) decrease the distance of the sieve in the side-to-side motion when the grain loss difference value is less than the predetermined grain loss difference threshold.

5. The side-shaking control system of claim 1, further comprising:
   a comparator configured to compare: (i) the first grain loss value to a predetermined grain loss threshold value; and (ii) the second grain loss value to the predetermined grain loss threshold value, and
   wherein the programmed controller is further configured to cause the side-shaking mechanism to: (i) increase the distance of the sieve in the side-to-side motion when the first grain loss value is equal to or greater than the predetermined grain loss threshold value; or (ii) decrease the distance of the sieve in the side-to-side motion when the second grain loss value is less than the predetermined grain loss threshold value.

6. The side-shaking control system of claim 1, further comprising a grain loss indicator configured to indicate: (i) the first grain loss value; and (ii) the second grain loss value received from the programmed controller.

7. The side-shaking control system of claim 6, wherein the grain loss indicator is a display configured to indicate: (i) the first grain loss value; and (ii) the second grain loss value.

8. The side-shaking control system of claim 6, wherein the grain loss indicator is an audio indicator and the programmed controller is further configured to cause the first grain loss value and the second grain loss value to be aurally indicated by the audio indicator.

9. The side-shaking control system of claim 1, wherein the programmed controller is further configured to (i) receive an input from an interface to control the movement of the side-shake mechanism; and (ii) control the side-shake mechanism to move the sieve in the side-to-side motion responsive to the received input.

10. The side-shaking control system of claim 9, further comprising a display, a portion of the display being a touch screen that comprises the interface.

11. The side-shaking control system of claim 1, wherein the programmed controller is further configured for:
    enabling the side-shaking mechanism;
    moving the side-shaking mechanism to a predetermined zero position;
    receiving the incline value representative of the inclination of the combine;
    receiving the first grain loss value and the second grain loss value; and
    based on the incline data and the first grain loss value and the second grain loss value, causing the side-shaking mechanism to (i) increase the distance of movement of the at least one sieve in the side-to-side motion; or (ii) decrease the distance of movement of the at least one sieve in the side-to-side motion.

12. The side-shaking control system of claim 11, wherein the predetermined zero position corresponds to a position of the side-shaking mechanism substantially centered between first and second side limits of the side-to-side motion, and the incline value indicates a first distance for moving the side-shaking mechanism away from the predetermined zero position on each side, the programmed controller being further configured to receive side-shaking mechanism bias data indicating a second distance for moving the side-shaking mechanism away from the predetermined zero position on each side, and cause the side-shaking mechanism to (i) increase the distance of movement of the at least one sieve in the side-to-side motion; or (ii) decrease the distance of movement of the at least one sieve in the side-to-side motion is based on the incline value, the first grain loss value, the second grain loss value, and the side-shaking mechanism bias data.

13. The side-shaking control system of claim 12, wherein the programmed controller is further configured to disable the side-shaking mechanism and cause the side-shaking mechanism to (i) stop moving the sieve in the side-to-side motion or (ii) start moving the sieve in a side-to-side motion based on:

the side-shaking mechanism bias data if the side-shaking mechanism is disabled; and the first grain loss value, the second grain loss value, the incline value and the side-shaking mechanism bias data if the side-shaking mechanism is enabled.

14. The side-shaking control system of claim 12, wherein the controller is further configured to receive an engine speed value indicating whether a speed of a combine engine has reached a predetermined percentage of a high idle speed of the combine engine, and modifying action of the side-shaking mechanism dependent upon the engine speed value.

* * * * *